United States Patent
Deshpande et al.

(10) Patent No.: US 7,535,926 B1
(45) Date of Patent: May 19, 2009

(54) DYNAMIC INTERFACE CONFIGURATION FOR SUPPORTING MULTIPLE VERSIONS OF A COMMUNICATION PROTOCOL

(75) Inventors: Prasad Deshpande, Framingham, MA (US); Eric L. Peterson, Carlisle, MA (US); Thomas M. Mistretta, Danvers, MA (US); Mathias Kokot, Medford, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 702 days.

(21) Appl. No.: 11/031,857

(22) Filed: Jan. 7, 2005

(51) Int. Cl.
 *H04L 12/28* (2006.01)

(52) U.S. Cl. ............... 370/469; 370/392; 370/395.6; 709/223; 719/310

(58) Field of Classification Search ............... 370/469, 370/392, 395.6; 709/223; 719/310
See application file for complete search history.

(56) References Cited

U.S. PATENT DOCUMENTS

| | | | | |
|---|---|---|---|---|
| 5,557,748 | A * | 9/1996 | Norris | 709/220 |
| 5,903,754 | A * | 5/1999 | Pearson | 719/310 |
| 6,131,163 | A * | 10/2000 | Wiegel | 726/12 |
| 6,195,355 | B1 * | 2/2001 | Demizu | 370/397 |
| 6,496,479 | B1 * | 12/2002 | Shionozaki | 370/230 |
| 6,862,274 | B1 * | 3/2005 | Tsao et al. | 370/338 |
| 6,968,389 | B1 | 11/2005 | Menditto et al. | |
| 6,990,107 | B1 * | 1/2006 | Rinne et al. | 370/395.6 |
| 7,231,452 | B2 * | 6/2007 | Ananda et al. | 709/230 |
| 7,281,058 | B1 | 10/2007 | Shepherd et al. | |
| 7,298,705 | B2 | 11/2007 | Shankar et al. | |
| 2002/0027906 | A1 | 3/2002 | Athreya et al. | |
| 2003/0009548 | A1 * | 1/2003 | Poynor | 709/223 |
| 2004/0062204 | A1 | 4/2004 | Bearden et al. | |
| 2004/0088389 | A1 | 5/2004 | Shah | |
| 2005/0099976 | A1 * | 5/2005 | Yamamoto et al. | 370/331 |

(Continued)

FOREIGN PATENT DOCUMENTS

WO     WO 03/067824     8/2003

OTHER PUBLICATIONS

U.S. Patent Application entitled "Service-specific Logical Interfaces for Providing VPN Customers Access to External Multicast Content", U.S. Appl. No. 11/031,959, filed Jan. 7, 2005.

(Continued)

*Primary Examiner*—Ricky Ngo
*Assistant Examiner*—Luat Phung
(74) *Attorney, Agent, or Firm*—Shumaker & Sieffert, P.A.

(57) ABSTRACT

Techniques are described for dynamically configuring an interface in a network service provider. The techniques allow dynamic configuration of, for example, a dual stacked interface that includes both Internet Protocol version 6 (IPv6) and Internet Protocol version 4 (IPv4) on the same layer 2 link. In this way, a customer network having an existing IPv4 connection to a network service provider will be able to run both IPv4 and IPv6 over the same interface. A network device within the network service provider may receive a control packet from a subscriber device. The packet may be received on an ATM hybrid permanent virtual circuit (PVC) that supports multiple interface columns. The network device is capable of auto-sensing multiple packet protocols and may dynamically create multiple interface columns over the same ATM interface based on the encapsulation type of the received packets.

35 Claims, 4 Drawing Sheets

U.S. PATENT DOCUMENTS

| | | |
|---|---|---|
| 2005/0232228 A1 | 10/2005 | Dharanikota et al. |
| 2005/0265308 A1 | 12/2005 | Barbir et al. |
| 2005/0265397 A1 | 12/2005 | Chapman et al. |
| 2006/0028998 A1* | 2/2006 | Lioy et al. .................. 370/252 |
| 2006/0088031 A1 | 4/2006 | Nalawade |
| 2006/0274774 A1 | 12/2006 | Srinivasan et al. |
| 2007/0047549 A1* | 3/2007 | Park ........................... 370/392 |
| 2007/0097972 A1 | 5/2007 | Jain et al. |

OTHER PUBLICATIONS

U.S. Patent Application entitled "Multicast in BGP/MPLS VPNS and VPLS", U.S. Appl. No. 60/605,629, filed Aug. 20, 2004.

* cited by examiner

DYNAMIC INTERFACE CONFIGURATION FOR SUPPORTING MULTIPLE VERSIONS OF A COMMUNICATION PROTOCOL

TECHNICAL FIELD

The invention relates to computer networks, and more particularly to interface configuration on computer networks.

BACKGROUND

Customer networks are networks established by individuals or companies for internal communication. Customer networks may include local area networks (LAN) or wide area networks (WAN) that comprise a plurality of subscriber devices, such as personal computers, laptops, workstations, personal digital assistants (PDAs), wireless devices, network-ready appliances, filer servers, print servers or other devices. The customer networks may meet customer-specific needs using a number of different communication protocols, such as Asynchronous Transfer Mode (ATM) protocol, Ethernet protocol, Bridged Ethernet protocol, frame relay protocols or other communication protocols. ATM and frame relay protocols, for example, are frequently used for transport of audio, video, and computer data between a source and destination device within a customer network. Such protocols may transfer information in fixed-length units, such as frames.

To transfer the frames, switches within a customer network create a fixed network path, referred to as a virtual circuit. The frames transmitted by a source device within the customer network travel along the virtual circuit created by the switches. A destination device receives the frames from the virtual circuit, and reassembles the information from the frames.

Another popular network technology is the Internet Protocol (IP) networking protocol in which information is divided into variable-length blocks called packets. In contrast to frame-based protocols, such as ATM and frame relay, IP-based networks individually route these packets, also referred to as datagrams, across the network from a source device to a destination device. In other words, unlike the virtual circuits within a customer network, each packet can take a different route from the source to the destination device within the IP network. The destination device reorders the packets upon receipt, extracts the information from the packets, and assembles the information into its original form.

In order to allow remote customer networks to communicate, IP-based communication techniques are being developed that relay frames through an IP network, such as the Internet. According to the techniques, a network service provider of the IP network can receive frames from one of the customer networks, encapsulate the frames within packets, and route the packets through the IP network to the other customer network.

The IP network may support both a widely implemented Internet Protocol version 4 (IPv4) and a proposed Internet Protocol version 6 (IPv6). IPv4 defines a limited global address space comprising $2^{32}$ globally unique addresses, which have recently become scarce. IPv6 addresses the lack of available globally unique addresses by increasing the number of available globally unique addresses from $2^{32}$ to $2^{128}$. Currently, a customer network requires a dual interface configuration in order to access both portions of the IP network. However, statically implementing a dual interface column on each virtual circuit of the customer network may waste network service provider resources by creating unnecessary IP interfaces.

SUMMARY

In general, the invention is directed to techniques for dynamically configuring an interface in a network service provider device. More specifically, the techniques allow dynamic configuration of a dual stacked interface that supports both Internet Protocol version 6 (IPv6) and Internet Protocol version 4 (IPv4) on a common (i.e., shared) layer 2 link. In this way, a customer network having an existing IPv4 connection to a network service provider will be able to run both IPv4 and IPv6 over the same connection. In this manner, the customer and the network service provider need not implement multiple interfaces to support both IPv4 and IPv6 communications.

For example, a customer network running Asynchronous Transfer Mode (ATM) protocol may be connected to a network running both IPv4 and IPv6, such as the Internet. In other cases, the customer network may run other layer 2 protocols, such as the Ethernet protocol, Bridged Ethernet protocol, or frame relay protocols. The techniques described herein allow subscriber devices included in the customer network to access information in both the IPv4 portion and the IPv6 portion of the network over a common layer 2 link.

A network device within the network service provider may receive a control packet from one of the subscriber devices of the customer network. The packet may be received on an ATM hybrid permanent virtual circuit (PVC) that supports multiple interface columns. The network device "auto-senses" the type of packet received and configures the existing ATM interface to create the desired interface column. The network device may be capable of auto-sensing multiple protocols, and may dynamically create multiple interface columns over the same ATM interface based on the encapsulation type of the received packets. In this manner, multiple interface columns may be configured over a single layer 2 interface, and network service provider resources may be preserved by only building interface columns for which traffic is received.

In one embodiment, a method comprises receiving a plurality of packets on a single layer 2 interface of a network device and sensing a protocol of each of the plurality of packets. The method further comprises dynamically building an interface column over the single layer 2 interface for each of the protocols sensed from the plurality of packets.

In another embodiment, a computer-readable medium comprises instructions that cause a programmable processor to receive a plurality of packets on a single layer 2 interface and sense a protocol of each of the plurality of packets. The instructions further cause the programmable processor to dynamically build an interface column over the single layer 2 interface for each of the protocols sensed from the plurality of packets.

In another embodiment, a network device comprises an interface element that includes an interface controller and a layer 2 physical interface, and a forwarding controller that receives a plurality of packets from the layer 2 physical interface and forwards the received packets to the interface controller. The network device further comprises an auto-sense module included in the interface controller that auto-senses a protocol of each of the plurality of packets. The network device also includes a dynamic configuration manager included in the interface element that dynamically builds multiple interface columns over the layer 2 physical interface based on the sensed protocols, wherein each of the interface columns corresponds to a different one of the sensed protocols.

In a further embodiment, a network device comprises a dynamic interface stack including an Internet Protocol version 4 (IPv4) interface column and an Internet Protocol version 6 (IPv6) interface column dynamically built over a single layer 2 link.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
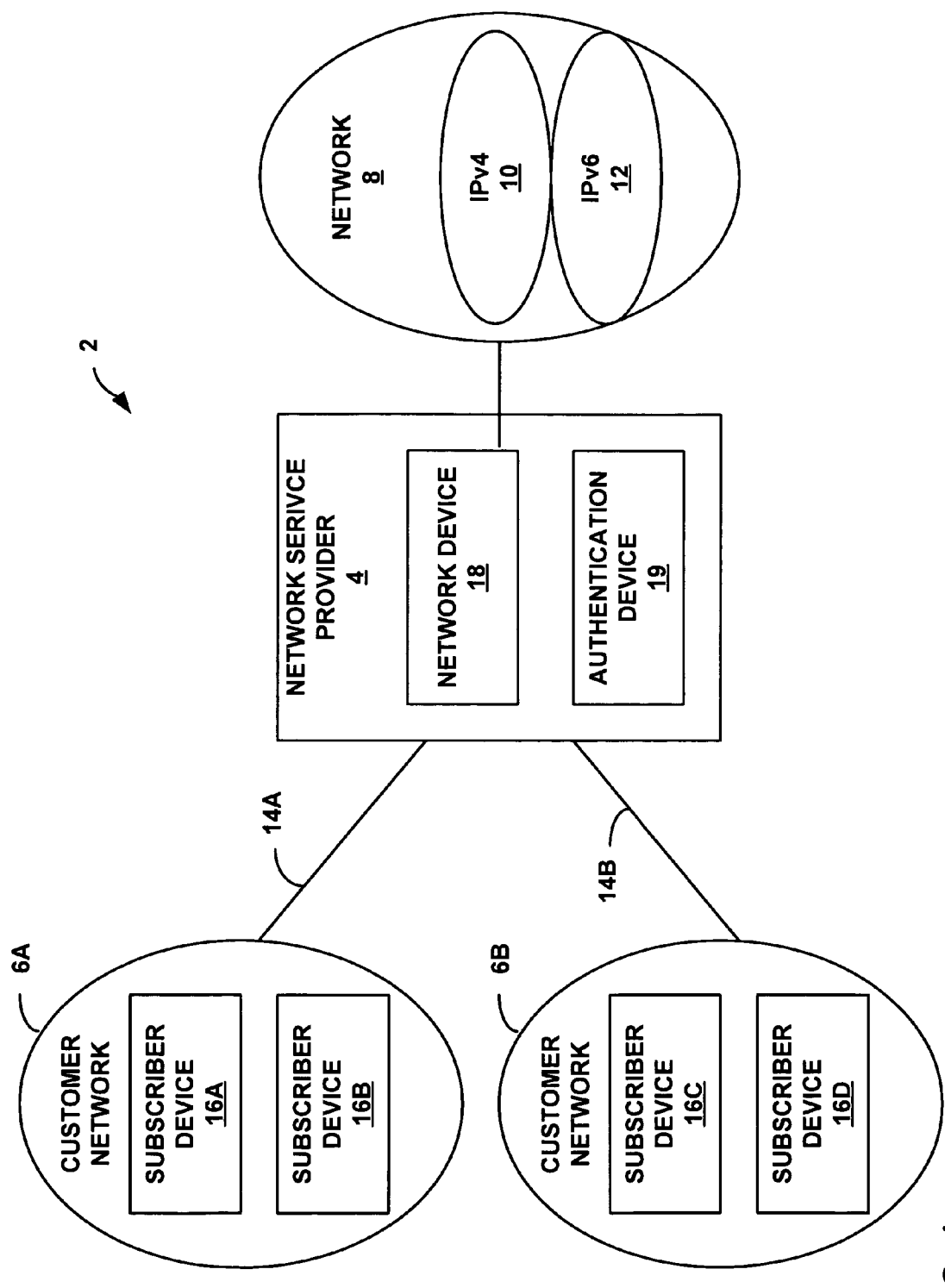
FIG. 1 is a block diagram illustrating an example system in which a network service provider provides customer networks with connectivity to a network.

FIG. 1 is a block diagram illustrating an example system 2 in which a network service provider 4 provides customer networks 6A-6B ("customer networks 6") with connectivity to a network 8. Network 8 represents any Internet Protocol (IP) computer network and may have a variety of networked resources capable of data communication. For example, network 8 may include routers, hubs, gateways, servers, workstations, network printers and faxes, and the like. Moreover, network 8 may be the Internet, in which case network service provider 4 may be an Internet Service Provider (ISP).

As illustrated in FIG. 1, network 8 includes both a widely-implemented IPv4 portion 10 and a currently minimally implemented IPv6 portion 12. IPv4 defines a global address space comprising $2^{32}$ globally unique addresses. Because of the demand for global addresses, the vast majority of devices within a local area network (LAN), e.g., customer network 6A, are typically assigned local addresses that are unique to the local network, but not globally. In order to communicate with devices outside of the LAN, such as devices coupled to a global network like the Internet, the devices of the LAN make use of a pool of a limited number of globally unique addresses. The globally unique addresses may, for example, be assigned from an ISP, typically in the form of one or more blocks of global addresses. IPv6 addresses the lack of available globally unique addresses by increasing the number of available globally unique addresses from $2^{32}$ to $2^{128}$ by defining a 128-bit IP address space to replace the current 32-bit address space defined by IPv4. The vast availability of globally unique addresses with the implementation of IPv6 allows each device within a LAN to be assigned a globally unique address.

Customer networks 6 represent networks established by individuals or companies for internal communication. Customer networks 6 may include LANs or wide area networks (WANs) that comprise a plurality of subscriber devices 16A-16D ("subscriber devices 16"). Subscriber devices 16 may include personal computers, laptops, workstations, personal digital assistants (PDAs), wireless devices, network-ready appliances, filer servers, print servers or other devices that access network 8 via network service provider 4. In the illustrated embodiment, customer networks 6A and 6B each comprise two subscriber devices 16. In other embodiments, any number of customer networks 6 containing any number of subscriber devices 16 may communicate with network service provider 4.

Subscriber devices 16 within customer networks 6 may communicate with each other or with other devices via network 8. Customer networks 6 may be customer-specific networks that use layer 2 protocols, such as Asynchronous Transfer Mode (ATM), Ethernet, Bridged Ethernet, frame relay and the like, that communicate information in fixed or variable-sized units referred to as frames. Network service provider 4 may receive the frames encapsulated within IP packets over a number of layer 2 links (e.g., an ATM virtual circuit (VC)) coupled to network service provider 4 of network 8. In general, network service provider 4 receives packets including frames from customer networks 6, and routes the packets through network 8. In this manner, subscriber devices 16 within customer networks 6 may transparently communicate frames across network 8.

In the illustrated embodiment, each of customer networks 6 utilizes an IP protocol 14A-14B ("IP 14") over an ATM hybrid permanent VC (PVC) that supports multiple interface columns to communicate with network service provider 4. IP 14 may comprise the frames from customer networks 6 encapsulated within either the IPv4 or the IPv6 protocol. In some embodiments, customer networks 6 may include digital subscriber line access multiplexers (DSLAMs) that connect directly to subscriber devices 16 within each of customer networks 6. A Broadband Remote Access Server (BRAS) application may then aggregate output from the DSLAMs into a higher-speed uplink to network service provider 4.

As illustrated in FIG. 1, network service provider 4 includes a network device 18 and an authentication device 19. In some embodiments, network device 18 may comprise a router that maintains routing information between customer networks 6 and network 8. Network device 18 may support the BRAS application. One of subscriber devices 16 of customer networks 6, e.g., subscriber device 16A, requests access to network 8 from network service provider 4, and provides user information, such as a username and password. Network device 18 authenticates the user information. In some cases, network device 18 may, for example, internally authenticate the user information, or may forward the user information to authentication device 19. Upon authenticating the user information, network device 18 receives a control packet on the ATM hybrid PVC from subscriber device 16A and looks at the encapsulation type of the packet.

The dynamic configuration techniques described herein allow network device 18 to "auto-sense" multiple types of inbound packets, and dynamically create multiple interface columns over an existing layer 2 interface, such as an ATM hybrid PVC, based on the packet encapsulation types. As a result, network device 18 may dynamically create an IPv6 interface over the same virtual circuit as an IPv4 interface. In this way, the techniques may preserve resources of network service provider 4 by only configuring interface columns for which packets are received.

In some embodiments, the interfaces maintain separate statistics, and network device 18 may attach separate Quality of Service (QoS) polices to the interfaces. The two interfaces may also have different attributes or protocols configured on them based on a service profile. In some cases, authentication device 19 may assign the service profile to the newly configured interface after authenticating the user information from the corresponding subscriber device 16. Using service profiles can reduce management of a large number of interfaces by applying a set of characteristics to multiple interfaces.

Unlike some conventional techniques, network device 18 dynamically creates multiple interface columns over an existing layer 2 interface, thereby allowing the existing layer 2 interface to be used for both IPv4 and IPv6 traffic. Each virtual circuit connected to network service provider 4 may not require support of both protocols. Because the multiple interface columns are dynamically created, resources of network service provider 4 need not be wasted statically configuring interfaces to support both protocols on each virtual circuit. Network device 18 creates multiple interface columns only for those virtual circuits that require support for both IPv4 and IPv6. Consequently, the techniques may utilize fewer interfaces than techniques that statically create separate IPv6 and IPv4 interfaces over each ATM hybrid PVC. Further, the techniques may provide similar advantages over techniques that require two virtual circuits for each subscriber that requests access to both an IPv4 and an IPv6 portion of a network.

Figure 2:
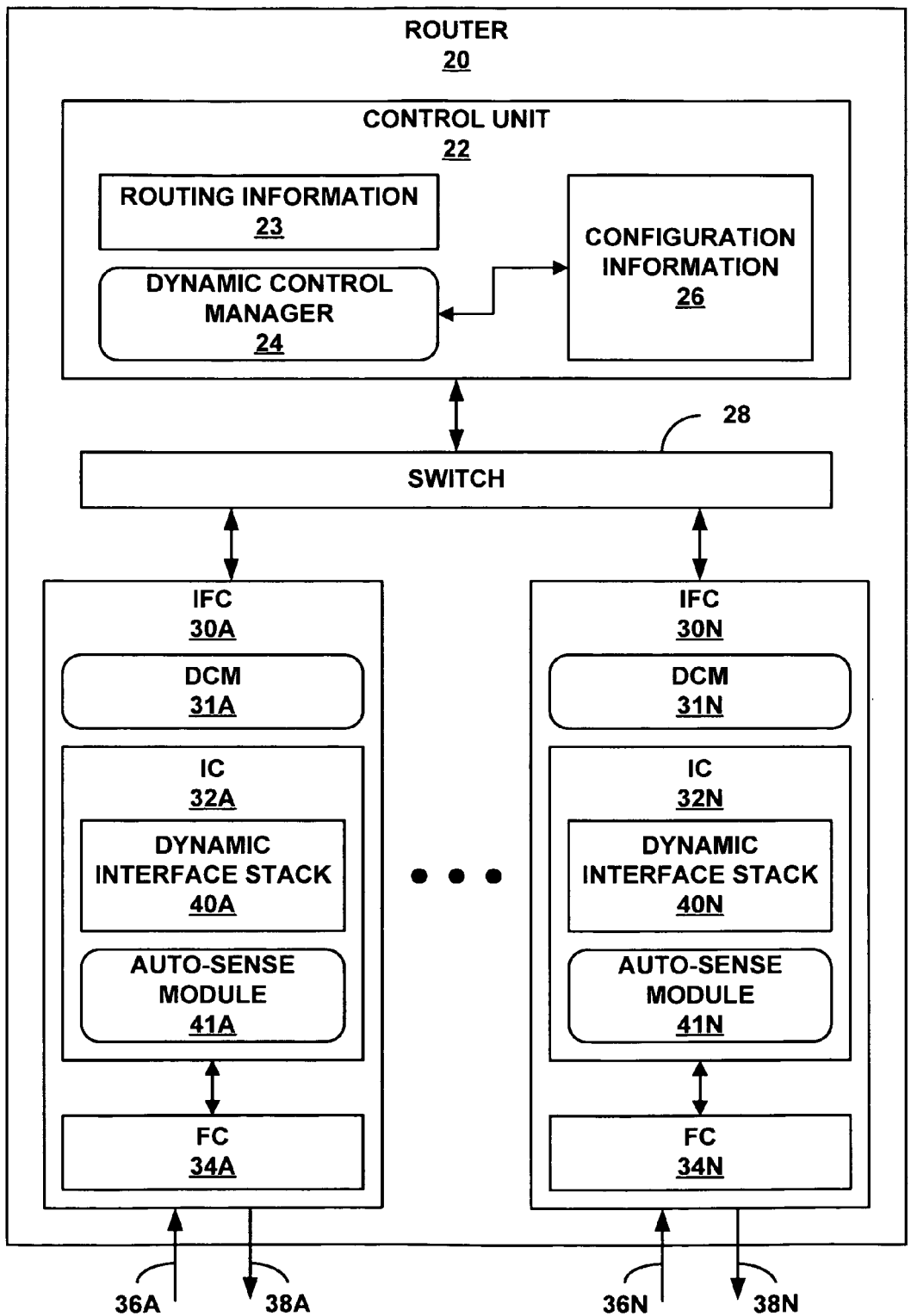
FIG. 2 is a block diagram illustrating an exemplary embodiment of a router from the example system of FIG. 1.

FIG. 2 is a block diagram illustrating an exemplary embodiment of a router 20. Router 20 may operate substantially similar to network device 18 (FIG. 1), and may be utilized by a network service provider substantially similar to network service provider 4 from FIG. 1. Router 20 is capable of dynamically configuring an IPv6 interface consistent with the principles of the invention. Router 20 auto-senses IPv4 packets, and IPv6 packets, and dynamically builds an IPv4 interface column and an IPv6 interface column respectively over the same layer 2 interface (e.g., ATM hybrid PVC). In other embodiments, router 20 may build a dual interface stack over other layer 2 interfaces, such as Ethernet, Bridged Ethernet, frame relay, or the like.

In the illustrated embodiment, router 20 includes a control unit 22 that maintains routing information 23 to reflect the current topology of a network, e.g., network 8 of FIG. 1, and other network entities to which router 20 is connected. Control unit 22 also comprises a dynamic configuration manager 24 that maintains configuration information 26 to reflect the current interface columns built for each virtual circuit connection to router 20. Router 20 also includes interface cards (IFCs) 30A-30N ("IFCs 30") that receive packets on inbound links 36A-36N ("inbound links 36") and send packets on outbound links 38A-38N ("outbound links 38"). IFCs 30 are coupled to control unit 22 via a high-speed switch 28.

In general, subscriber devices within customer networks (not shown in FIG. 2) send packets to router 20 over ATM hybrid PVCs that can support multiple interface columns. Each of IFCs 30 includes a dynamic configuration manager (DCM) 31, an interface controller (IC), and a forwarding controller (FC). When FCs 34 receive control plane packets from subscriber devices, for example subscriber devices 16 of FIG. 1, on inbound links 36, FCs 34 send the control plane packets to ICs 32. In other embodiments, interface controllers and forwarding controllers may be located in other components of router 20 (e.g., control unit 22) and not located within IFCs.

ICs 32 further include auto-sense modules 41 that are capable of auto-sensing multiple packet protocols. ICs 32 also include dynamic interface stacks 40 that dictate which packet protocols are currently supported on the corresponding ATM hybrid PVCs. Network service provider 4 configures an ATM layer in each of dynamic interface stacks 40. The configured ATM layer may then dynamically build multiple interface columns based on the encapsulation type of the received packets auto-sensed by auto-sense module 41.

When IC 32A, for example, receives a control plane packet, auto-sense module 41A senses which protocol is encapsulating the packet. IC 32A then uses dynamic interface stack 40A to determine whether an interface column already exists for the protocol of the received packet or if an interface column needs to be created.

In the case where the interface column does not exist in dynamic interface stack 40A, the ATM layer within dynamic interface stack 40A communicates with DCM 31A. Specifically, the ATM layer of dynamic interface stack 40A requests DCM 31A to create an interface column based on the encapsulation type of the received packet. In the case of an IPv4 packet, the ATM layer may request DCM 31A create a PPP over Ethernet (PPPoE) major interface, for example, over the ATM layer.

Upon receiving the layer creation request from the ATM layer in dynamic interface stack 40A, DCM 31A forwards the request to dynamic configuration manager 24 in control unit 22 via switch 28. Dynamic configuration manager 24 creates the requested layer, e.g. the PPPoE major interface, in control unit 22 and updates configuration information 26 to reflect the new interface column on the corresponding ATM hybrid PVC. Dynamic configuration manager 24 then enables DCM 31A within IFC 30A to configure the ATM layer in dynamic interface stack 40A to build the requested layer. The newly created layer reports its interface type and the interface type of the subsequent layer within dynamic interface stack 40A to FC 34A.

Once created, the interface layer runs a control protocol and determines if additional layers need to be created to complete the interface column for the packet. To further the example, a PPPoE major layer running the control protocol would request a PPPoE sub interface be created by DCM 31A. After updating configuration information 26 with the PPPoE sub interface, DCM 31A configures the PPPoE major interface to build the new layer over the PPPoE major interface in dynamic interface stack 40A. The PPPoE sub layer then requests building a PPP interface over the PPPoE sub layer. Finally, the PPP layer requests an IPv4 interface to complete the interface column.

In the case of auto-sense module 41A sensing an IPv6 packet received by FC 34A, the ATM layer within dynamic interface stack 40A requests DCM 31A create an IPv6 interface over the ATM layer. In the same process as described above, DCM 31A forwards the request to dynamic configuration manager 24 in control unit 22 via switch 28. Dynamic configuration manager 24 creates the IPv6 requested layer in control unit 22 and updates configuration information 26 to reflect the new interface column on the corresponding ATM hybrid PVC. Dynamic configuration manager 24 then enables DCM 31A to configure the ATM layer to build the requested layer in dynamic interface stack 40A. In other embodiments, an IPv6 interface may comprise a PPP-style interface similar to the IPv4 interface described above. In that case, the IPv6/PPP interface may be built over another PPPoE sub layer of the PPPoE major layer created for the IPv4 interface column.

In the event FC 34A only receives IPv4 packets, only an IPv4 interface column will be built over the statically created ATM layer of IFC 30A. If, however, FC 34A also receives IPv6 packets, an IPv6 column will be dynamically built over the same ATM layer. Router 20 or an authentication device (e.g., authentication device 19 of FIG. 1) may apply service profiles to complete the creation of the interface columns. The service profiles may enable various features, protocols, or QoS profiles for the interfaces. In one embodiment, the IPv4 interface column and the IPv6 interface column maintain separate statistics and separate service profiles.

Once an interface column corresponding to a received packet's encapsulation type is created in dynamic interface stacks 40, DCMs 31 may pass the control packet up the interface column. ICs 32 then pass the control packet to control unit 22 via switch 28. Control unit 22 may update routing information 23 based on the control plane packet. Control unit 22 may acknowledge receipt of the control plane packet by sending acknowledgement messages to the corresponding subscriber devices via FCs 34 and outbound links 38.

Figure 3A:
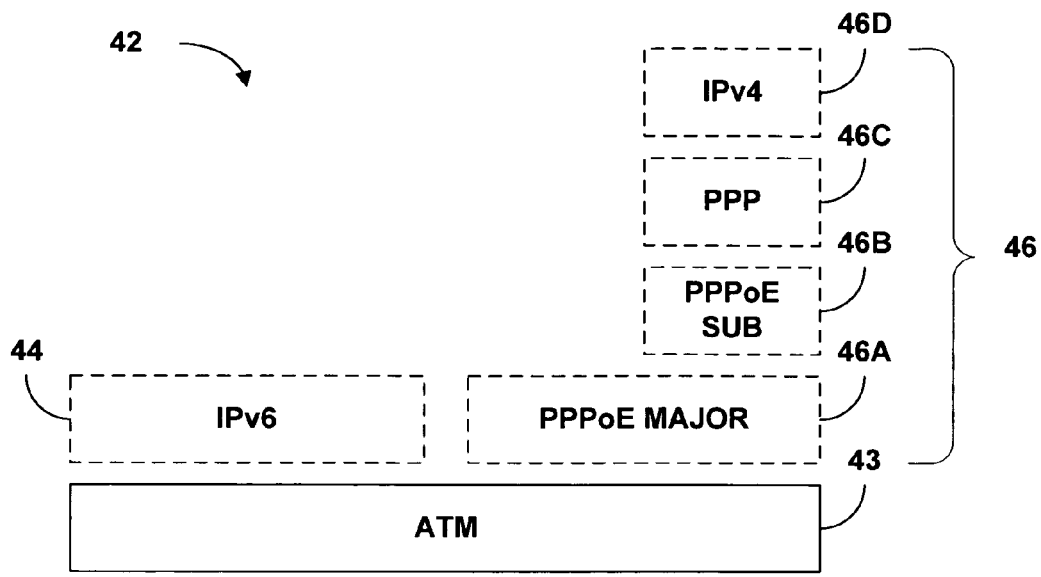
FIG. 3A is a diagram illustrating an exemplary embodiment of a dynamic interface stack utilized by the router of FIG. 2.

FIG. 3A is a block diagram illustrating an exemplary embodiment of a dynamic interface stack 42. Dynamic interface stack 42 may operate substantially similar to any of dynamic interface stacks 40 utilized by router 20 of FIG. 2. In the exemplary embodiment of FIG. 3A, dynamic interface stack 42 comprises a dual stacked interface including an IPv6 interface column and an IPv4 interface column on the same ATM hybrid PVC. Dynamic interface stack 42 includes an ATM interface 43 which is typically statically created. For example, a network service provider may statically provision ATM interface 43. In the illustrated embodiment, ATM interface 43 comprises a 1483 ATM hybrid PVC. In other embodiments, ATM interface 43 may comprise another ATM subinterface, Ethernet, Bridged Ethernet, frame relay, or another layer 2 interface.

The dynamic configuration techniques described herein allow ATM interface 43 to auto-sense multiple packet protocols, e.g., IPv4 and IPv6. Therefore, when router 20 receives an IPv4 packet on an ATM hybrid PVC, ATM 43 may be configured to build an IPv4 interface column 46. When router 20 receives an IPv6 packet on the same ATM hybrid PVC, ATM 43 may also be configured to build an IPv6 interface column 44.

The IPv4 interface column 46 includes a PPPoE major layer 46A, a PPPoE sub layer 46B, a PPP layer 46C, and an IPv4 layer 46D. In some cases PPPoE major layer 46A may build multiple PPPoE sub layers, which may build multiple IPv4 interfaces. In other embodiments, an IPv6 interface may also comprise a PPP-style interface. In that case, the IPv6/PPP interface may be built over another PPPoE sub layer of PPPoE major layer 46A.

Figure 3B:
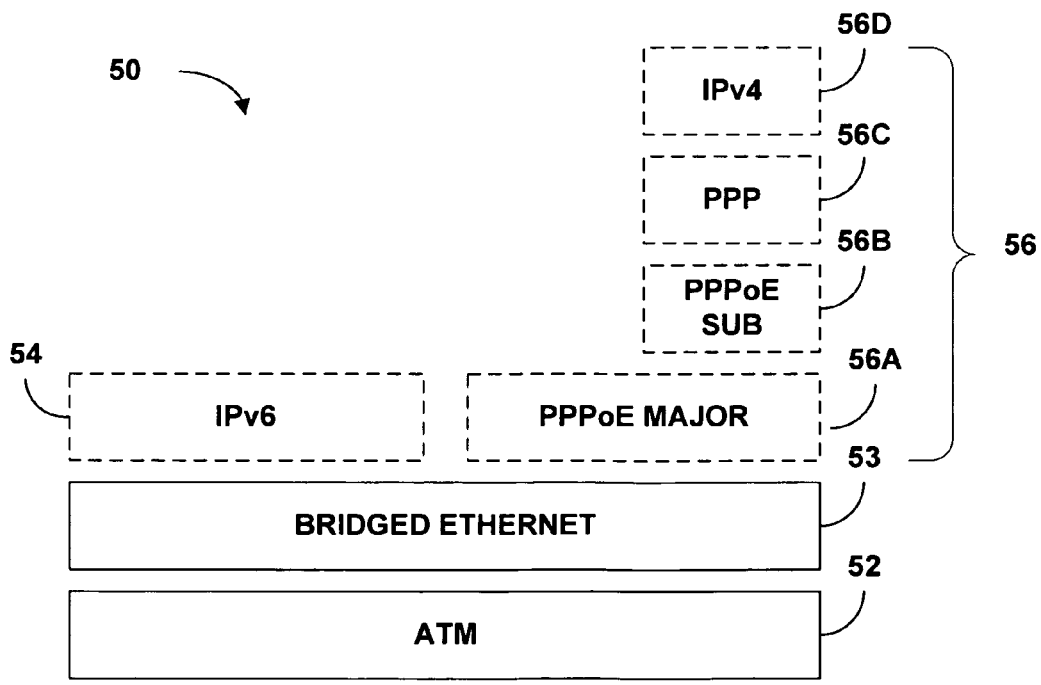
FIG. 3B is a diagram illustrating another exemplary dynamic interface stack that may be utilized by the router from FIG. 2.

FIG. 3B is a block diagram illustrating another exemplary dynamic interface stack 50 that may be utilized by router 20 from FIG. 2. Dynamic interface stack 50 may operate substantially similar to dynamic interface stack 40. Dynamic interface stack 50 comprises a dual stacked interface including an IPv6 interface column and an IPv4 interface column on the same ATM hybrid PVC. Unlike dynamic interface stack 42 from FIG. 3A, dynamic interface stack 50 includes a statically created ATM interface 52 and a bridged Ethernet interface 53, which may be either statically or dynamically created over ATM interface 52. Network service provider 4 may provision ATM interface 42 and optionally bridged Ethernet interface 53.

In this case, ATM interface 52 may operate as a conventional ATM interface and only auto-sense a single protocol, e.g., the bridged Ethernet protocol. ATM 53 may then dynamically build bridged Ethernet layer 53. The dynamic configuration techniques described herein allow bridged Ethernet layer 53 to auto-sense multiple packet encapsulation types, e.g., IPv4 and IPv6. Therefore, when router 20 receives an IPv4 packet on an ATM hybrid PVC, bridged Ethernet 53 may be configured to build an IPv4 interface column 56. When router 20 receives an IPv6 packet on the same ATM hybrid PVC, bridged Ethernet 53 may also be configured to build an IPv6 interface column 54.

The IPv4 interface column 56 includes a PPPoE major layer 56A, a PPPoE sub layer 56B, a PPP layer 56C and an IPv4 layer 56D. In some cases PPPoE major layer 56A may build multiple PPPoE sub layers, which may build multiple IPv4 interfaces. In other embodiments, an IPv6 interface may also comprise a PPP-style interface. In that case, the IPv6/PPP interface may be built over another PPPoE sub layer of PPPoE major layer 56A.

Figure 4:
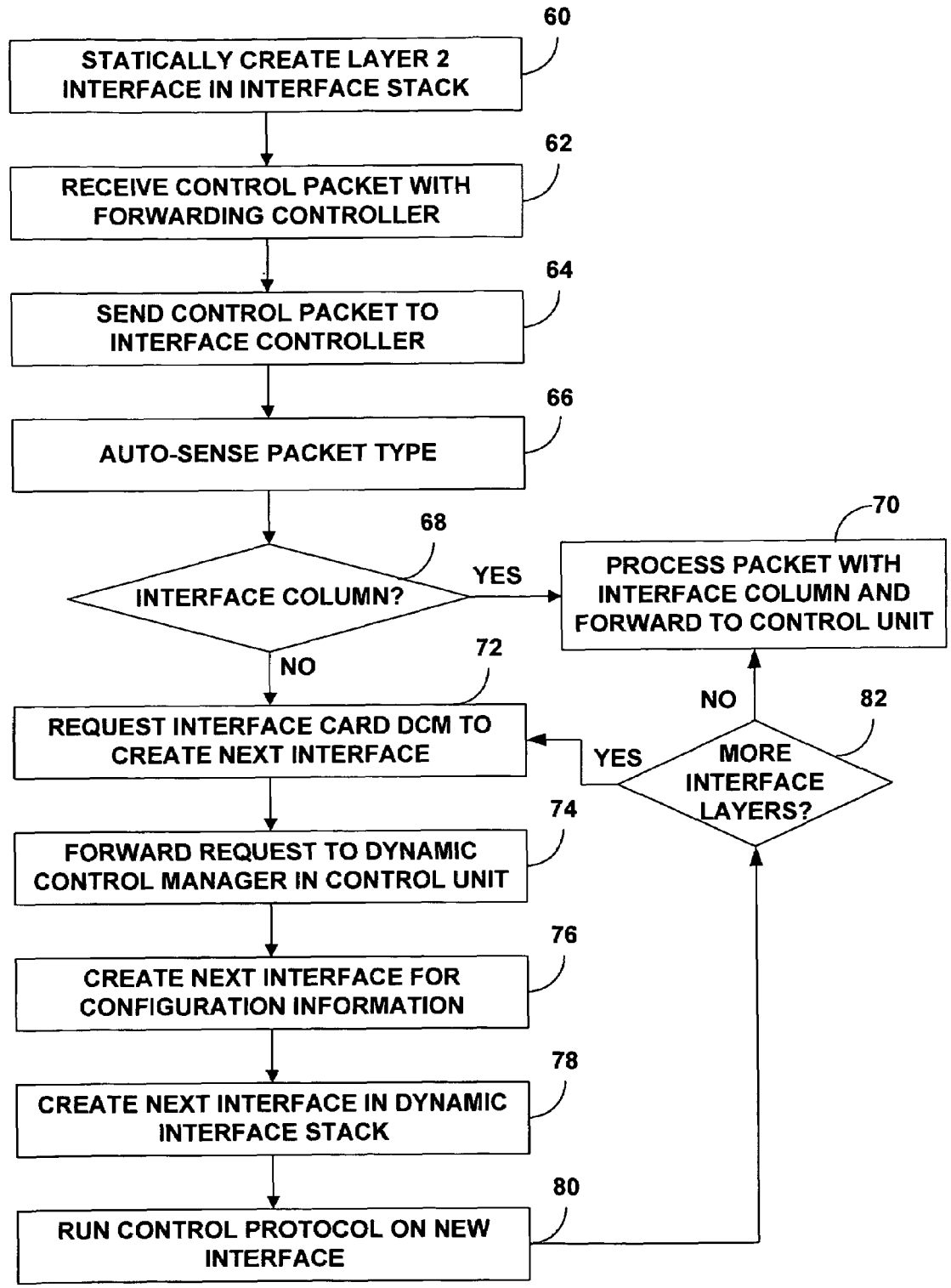
FIG. 4 is a flow chart illustrating an exemplary method for dynamically building an IPv6 interface consistent with the principles of the invention.

FIG. 4 is a flowchart illustrating an exemplary method for dynamically building an interface stack consistent with the principles of the invention. For purposes of illustration, the flowchart of FIG. 4 will be described in reference to FIG. 2, although the method may be implemented on different architectures from that illustrated in FIG. 2.

Initially, network service provider 4 statically creates an ATM interface layer in dynamic interface stack 40A, for example, within interface controller (IC) 32A of router 20 (60). At some subsequent point in time, forwarding controller (FC) 34A receives a control packet from a subscriber device on an ATM hybrid PVC the can support multiple interface columns (62). The routing control packet may, for example, conform to a routing protocol and contain updated routing information.

FC 34A directs the control packet to IC 32A (64). Autosense module 41A within IC 32A auto-senses the encapsulation type, e.g., IPv4 and IPv6, of the received packet (66). IC 32A then utilizes dynamic interface stack 40A to determine whether an interface column has already been created for the protocol of the packet (68).

When an interface column corresponding to the received packet has already been built in dynamic interface stack 40A (yes branch of 68), the packet is passed up the interface column. The control packet may then be forwarded to control unit 22 via switch 28 to update routing information 23 (70).

In the case where the corresponding interface column has not yet been created (no branch of 68), the statically created ATM interface in dynamic interface stack 40A requests DCM 31A within IFC 30A to create the interface column for the received packet (72). In response, DCM 31A forwards the request to dynamic configuration manager 24 in control unit 22 (74). Dynamic configuration manager 24 then creates the next interface layer for the requested interface column over the ATM interface and updates configuration information 26 with the newly created layer (76). Dynamic configuration manager 24 then enables DCM 31A in IFC 30A to configure the ATM interface of dynamic interface stack 40A to build the next interface layer of the interface column (78).

Once the layer is created over the existing ATM interface in dynamic interface stack 40A, the newly created layer runs a control protocol (80) and determines whether another layer is required to complete the interface column corresponding to the received packet (82). If another layer is required (yes branch of 82), the control protocol executing within the dynamic interface stack 40A issues DCM 31A a request for the interface layer (72). DCM 31A repeats the process by forwarding the request to dynamic configuration manager 24 (74), which updates configuration information 26 (76) and enables DCM 21A to create the next interface within the interface column (78).

When all the layers of the requested interface column are built (no branch of 82), the control packet is passed up the interface column and forwarded to control unit 22 for processing (70). In some cases, the new layer may communicate with FC 32A to report its interface type and the interface type of the subsequent layer in dynamic interface stack 40A.

For example, when an IPv4 packet is sensed by auto-sense module 41A, DCM 31A must create a PPPoE major interface layer, a PPPoE sub interface layer, a PPP interface layer, and an IPv4 interface layer over the statically created ATM layer to complete the IPv4 interface column. However, when an IPv6 packet is auto-sensed, DCM 31A only needs to create an IPv6 interface layer over the ATM interface. In other embodiments, an IPv6 packet may also comprise a PPP-style packet. In that case, an IPv6/PPP interface may be built over another PPPoE sub layer of the PPPoE major layer built for the IPv4 interface column.

The interface configuration techniques described above allow multiple packet encapsulation types to be auto-sensed by a network device of a network service provider. Multiple interface columns corresponding to the auto-sensed protocols may be created over a single layer 2 interface. In this way, the techniques may preserve resources of a network service provider by only building interface columns for which traffic is received and by building multiple interface columns on the same layer 2 link.

Various embodiments of the invention have been described. Although described for purposes of illustration to IPv4 and IPv6, the techniques may be readily applied to any computing environment in which multiple versions (i.e., two or more versions) of a communication protocol may be supported on one or more communication links. These and other embodiments are within the scope of the following claims.

The invention claimed is:

1. A method comprising:
   statically creating a layer 2 interface within a network device;
   authenticating user information received from a subscriber device via the statically created layer 2 interface, wherein the layer 2 interface comprises a bridged Ethernet interface created over an Asynchronous Transfer Mode (ATM) interface;
   after authenticating the user information received from the subscriber device, receiving from the subscriber device a plurality of packets on the statically configured layer 2 interface of the network device;
   sensing a protocol of each of the plurality of packets, wherein at least two of the packets correspond to at least two different protocols; and
   dynamically building a plurality of interface columns over the same statically created layer 2 interface to process the plurality of packets from the subscriber device, wherein the plurality of interface columns built over the statically created layer 2 interface include a respective column for each of the at least two different protocols sensed from the plurality of packets.

2. The method of claim 1, wherein the plurality of packets comprise control plane packets.

3. The method of claim 1, further comprising forwarding each of the plurality of received packets to a network device interface controller.

4. The method of claim 1, further comprising processing each of the plurality of packets with one of the plurality of interface columns that corresponds to the sensed protocol of the respective one of the plurality of packets.

5. The method of claim 1, further comprising determining, for each of the sensed protocols, whether one of the plurality of interface columns already exists in a dynamic interface stack included in an interface card of the network device to process one of the plurality of packets corresponding to each of the sensed protocols.

6. The method of claim 5, further comprising processing each of the plurality of packets with the one of the plurality of interface columns corresponding to the sensed protocol of the respective packet when the one of the plurality of interface columns is determined to already exist.

7. The method of claim 5, further comprising dynamically building the one of the plurality of interface columns over the layer 2 interface for each of the sensed protocols when the one of the plurality of interface columns is determined to not already exist.

8. The method of claim 1,
   wherein each of the plurality of interface columns comprises at least two interface layers, and
   wherein dynamically building each of the plurality of interface columns comprises dynamically creating the at least two interface layers of each of the plurality of interface columns.

9. The method of claim 1, wherein dynamically building the plurality of interface columns comprises:
   receiving an interface layer creation request with a first dynamic configuration manager included in an interface card of the network device;
   forwarding the interface layer creation request to a second dynamic configuration manager included in a control unit of the network device;
   creating the requested interface layer with the second dynamic configuration manager;
   enabling the first dynamic configuration manager to create the requested layer within the interface card; and
   creating the requested layer within the interface card with the first dynamic configuration manager.

10. The method of claim 9, further comprising updating configuration information in the control unit to include the dynamically created interface layer.

11. The method of claim 9, further comprising creating the requested layer over the layer 2 interface in a dynamic interface stack included in the interface card.

12. The method of claim 9, further comprising running a control protocol with the dynamically created layer and determining whether one of the plurality of interface columns requires additional interface layers.

13. The method of claim 1, wherein dynamically building the plurality of interface columns over the layer 2 interface comprises:
   dynamically building an Internet Protocol version 4 (IPv4) interface column over the layer 2 interface when the network device interface senses an IPv4 packet; and
   dynamically building an Internet Protocol version 6 (IPv6) interface column over the layer 2 interface when the network device interface senses an IPv6 packet.

14. A computer-readable medium comprising instructions that cause a programmable processor to:
   statically create a layer 2 interface within a network device, wherein the layer 2 interface comprises a bridged Ethernet interface created over an Asynchronous Transfer Mode (ATM) interface;
   authenticate user information received from a subscriber device via the statically created layer 2 interface
   after statically creating the layer 2 interface, and authenticating the user information received from the subscriber device receive, from the subscriber device, a plurality of packets on the statically created layer 2 interface;
   sense a protocol of each of the plurality of packets, wherein at least two of the packets correspond to at least two different protocols; and
   dynamically build a plurality of interface columns over the statically created layer 2 interface to process the plurality of packets form the subscriber device, wherein the plurality of interface columns built over the statically created layer 2 interface include a respective column for each of the at least two different protocols sensed from the plurality of packets.

15. The computer-readable medium of claim 14, wherein the instructions for dynamically building the plurality of interface columns cause the programmable processor to:
receive an interface layer creation request with a first dynamic configuration manager included in an interface card of the network device;
forward the interface layer creation request to a second dynamic configuration manager included in a control unit of the network device;
create the requested interface layer with the second dynamic configuration manager;
enable the first dynamic configuration manager to create the requested layer within the interface card; and
create the requested layer within the interface card with the first dynamic configuration manager.

16. A network device comprising:
an interface element that includes an interface controller and a layer 2 interface, wherein the layer 2 interface is statically created within the interface element, and wherein the layer 2 interface comprises a bridged Ethernet interface created over an Asynchronous Transfer Mode (ATM) interface;
a forwarding controller that receives user information from a subscriber device via the statically created layer 2 interface, wherein the network device authenticates the user information, and
wherein the forwarding controller, after the layer 2 interface is statically created and the user information is authenticated, receives a plurality of packets from the statically created layer 2 interface and forwards the received packets to the interface controller;
an auto-sense module included in the interface controller that auto-senses a protocol of each of the plurality of packets, wherein at least two of the packets correspond to at least two different protocols; and
a dynamic configuration manager included in the interface element that dynamically builds multiple interface columns over the statically created layer 2 interface based on the sensed protocols, wherein each of the interface columns corresponds to one of the at least two different protocols.

17. The network device of claim 16, wherein the plurality of packets comprise control plane packets.

18. The network device of claim 16, wherein the interface controller passes each of the plurality of packets to the interface column corresponding to the sensed protocol of the respective packet for processing.

19. The network device of claim 16, further comprising a dynamic interface stack included in the interface controller that includes the layer 2 interface and the multiple interface columns dynamically built over the layer 2 interface.

20. The network device of claim 19, wherein the interface controller determines whether an interface column for each of the sensed protocols already exists in the dynamic interface stack.

21. The network device of claim 20, wherein the interface controller passes each of the plurality of packets to the interface column corresponding to the sensed protocol of the respective packet for processing when the interface column exists.

22. The network device of claim 20, wherein the dynamic configuration manager dynamically builds an interface column over the layer 2 interface for each of the sensed protocols when the interface column does not already exist.

23. The network device of claim 16, wherein each of the interface columns comprises at least two interface layers, and wherein the dynamic configuration manager dynamically creates each of the interface layers for each of the interface columns.

24. The network device of claim 16, wherein the dynamic configuration manager comprises a first dynamic configuration manager and the network device further comprises a control unit with a second dynamic configuration manager, wherein the first dynamic configuration manager forwards an interface layer creation request for one of the interface columns to the second dynamic control manger.

25. The network device of claim 24, wherein the second dynamic configuration manager:
receives the interface layer creation request from the first dynamic configuration manager;
creates the requested layer of the interface column; and
enables the first dynamic configuration manager to create the requested layer within the interface element.

26. The network device of claim 25, wherein the second dynamic configuration manager updates configuration information within the control unit to include the dynamically created interface layer.

27. The network device of claim 25, wherein the first dynamic configuration manager creates the requested layer over the layer 2 interface in a dynamic interface stack included in the interface controller.

28. The network device of claim 27, wherein the dynamically created layer in the dynamic interface stack runs a control protocol and determines whether the interface column requires additional interface layers.

29. The network device of claim 25, further comprising a switch that communicatively couples the interface element and the control unit.

30. The network device of claim 16, wherein the dynamic configuration manager:
dynamically builds an Internet Protocol version 4 (IPv4) interface column over the layer 2 interface when the auto-sense module senses an IPv4 packet; and
dynamically builds an Internet Protocol version 6 (IPv6) interface column over the layer 2 interface when the auto-sense module senses an IPv6 packet.

31. The network device of claim 16, wherein the network device comprises a router.

32. The network device of claim 16, wherein the forwarding controller receives the plurality of packets from a subscriber device via a virtual circuit.

33. The network device of claim 32, wherein the virtual circuit comprises an Asynchronous Transfer Mode (ATM) hybrid permanent virtual circuit (PVC).

34. A network device comprising:
an interface element that includes an interface controller coupled to a layer 2 link;
an auto-sense module included in the interface controller that auto-senses a protocol of each of a plurality of packets received over a layer 2 interface statically created for the layer 2 link, wherein at least two of the packets correspond to at least two different protocols, wherein the layer 2 interface comprises a bridged Ethernet interface created over an Asynchronous Transfer Mode (ATM) interface; and
a dynamic configuration manager included in the interface element that, after receiving the packets, builds a dynamic interface stack including an Internet Protocol version 4 (IPv4) interface column and an Internet Protocol version 6 (IPv6) interface column dynamically built over the layer 2 interface.

35. The network device of claim 34, wherein the network device comprises a router.

* * * * *